United States Patent
Chen et al.

(10) Patent No.: US 9,967,861 B2
(45) Date of Patent: May 8, 2018

(54) UPLINK RESOURCE SCHEDULING METHOD, WIRELESS BASE STATION AND MOBILE STATION

(71) Applicant: NTT DoCoMo, Inc., Chiyoda-ku, Tokyo (JP)

(72) Inventors: Xiaohang Chen, Beijing (CN); Anxin Li, Beijing (CN); Atsushi Harada, Beijing (CN)

(73) Assignee: NTT DoCoMo, Inc., Tokyo (JP)

( * ) Notice: Subject to any disclaimer, the term of this patent is extended or adjusted under 35 U.S.C. 154(b) by 295 days.

(21) Appl. No.: 14/624,897

(22) Filed: Feb. 18, 2015

(65) Prior Publication Data
US 2015/0245320 A1    Aug. 27, 2015

(30) Foreign Application Priority Data

Feb. 21, 2014   (CN) .......................... 2014 1 0059203

(51) Int. Cl.
| | | |
|---|---|---|
| *H04W 72/04* | (2009.01) | |
| *H04W 72/12* | (2009.01) | |
| *H04L 5/00* | (2006.01) | |

(52) U.S. Cl.
CPC .............. *H04W 72/04* (2013.01); *H04L 5/003* (2013.01); *H04L 5/0069* (2013.01);
(Continued)

(58) Field of Classification Search
CPC .............. H04W 72/04; H04W 72/1226; H04W 72/121; H04L 5/003; H04L 5/0069; H04L 5/0091
See application file for complete search history.

(56) References Cited

U.S. PATENT DOCUMENTS

| | | | |
|---|---|---|---|
| 2008/0220806 A1* | 9/2008 | Shin ...................... | H04W 52/08 455/522 |
| 2013/0163537 A1* | 6/2013 | Anderson ......... | H04W 72/1284 370/329 |

(Continued)

OTHER PUBLICATIONS

Benjebbovu, et al., "System-Level Performance of Downlink NOMA for Future LTE Enhancements", IEEE Globecom Workshops, GC WKSHPS 2013, Dec. 9, 2013, pp. 66-70, XP032600027.

(Continued)

*Primary Examiner* — Walter Divito
(74) *Attorney, Agent, or Firm* — Harness, Dickey & Pierce, P.L.C.

(57) ABSTRACT

The embodiments of the present invention provide an uplink resource scheduling method, a wireless base station and a mobile station. The method comprises: generating group dedicated signaling respectively for mobile station groups managed by the wireless base station, wherein group dedicated signaling of each mobile station group indicates uplink resources allocated to the mobile station group; multiplexing the generated group dedicated signaling into different positions of a first channel and transmitting the multiplexed group dedicated signaling; generating mobile station dedicated signaling for each mobile station in each of the mobile station groups, wherein the mobile station dedicated signaling at least includes group information indicating the mobile station group to which the mobile station belongs; and multiplexing the generated mobile station dedicated signaling into a second channel and transmitting the multiplexed mobile station dedicated signaling.

18 Claims, 6 Drawing Sheets

(52) U.S. Cl.
CPC ......... *H04L 5/0091* (2013.01); *H04W 72/121* (2013.01); *H04W 72/1226* (2013.01)

(56) References Cited

U.S. PATENT DOCUMENTS

2014/0050279 A1    2/2014  Kishiyama
2014/0086093 A1*   3/2014  Liu .................. H04J 13/10
                                                    370/252

OTHER PUBLICATIONS

Extended European Search Report in corresponding EP Application 15155619.8 dated Jul. 17, 2015, 8 pages.

* cited by examiner

UPLINK RESOURCE SCHEDULING METHOD, WIRELESS BASE STATION AND MOBILE STATION

CROSS-REFERENCE TO RELATED APPLICATIONS

This application claims the benefit and priority of Chinese Application CN 201410059203.8, filed Feb. 21, 2014. The entire disclosure of the above application is incorporated herein by reference.

BACKGROUND

The present invention relates to an uplink resource scheduling method, a wireless base station and a mobile station, and more specifically, the present invention relates to an uplink resource scheduling method for a Non-Orthogonal Multiple Access (NOMA) system, a wireless base station and a mobile station.

In a Long Term Evolution (LTE) communication system and an LTE-Advanced communication system, when a mobile station (UE) needs to perform uplink transmission, it transmits a scheduling request signaling to a wireless base station (eNB), to obtain information of uplink resources serviceable for the mobile station from the wireless base station. In a communication system using a NOMA wireless access technology, it is proposed to distinguish a plurality of mobile stations by a transmission power, so that when uplink data are transmitted, data of different mobile stations are multiplexed to the same sub-band for transmission. Thereby, the number of the mobile stations for which the wireless base station can support simultaneous scheduling is increased.

In Release 8, the wireless base station notifies the uplink resources allocated to each mobile station, by respectively generating and transmitting a resource allocation signaling indicating the uplink resources allocated to the mobile stations for the mobile stations transmitting the scheduling requests thereto in a cell managed by the wireless base station. However, since in this method, the resource allocation signaling is respectively transmitted to the mobile stations, large signaling overhead is incurred. Further, in the NOMA communication system, with increased number of the mobile stations for which the wireless base station can support simultaneous scheduling, the signaling overhead incurred by the resource allocation signaling will further increase.

It has been proposed to notify the mobile station of the allocated uplink resources by two-stage signaling, to solve the problem of large signaling overhead. Specifically, first-stage signaling is cell dedicated signaling, wherein the cell dedicated signaling may include information indicating different uplink resources respectively allocated to the plurality of mobile stations in the cell managed by the wireless base station, which transmit the scheduling request to the wireless base station. The wireless base station may broadcast the cell dedicated signaling, so that all the mobile stations in the cell receive the signaling and decode it. In addition, second-stage signaling is mobile station dedicated signaling, wherein the wireless base station can respectively generate and transmit mobile station dedicated signaling for respective mobile stations managed thereby, and each mobile station dedicated signaling can indicate a position of information of the uplink resources allocated to a mobile station in the cell in the cell dedicated signaling. However, it is necessary to enable the mobile station with a worst channel state in the cell to receive the cell dedicated signaling being broadcast, so a coding rate of the cell dedicated signaling is determined based on the worst channel state of the mobile station, which results in unnecessary signaling overhead for the mobile stations with a better channel state. In addition, it is necessary for the mobile station to perform blind decoding twice in order to respectively obtain the cell dedicated signaling and the mobile station dedicated signaling, which increases a burden of the mobile station.

SUMMARY

In view of the above problems, it is desirable to provide an uplink resource scheduling method, a wireless base station and a mobile station, in order to reduce signaling overhead required for transmitting information indicating uplink resources allocated to the mobile stations.

According to one embodiment of the present invention, there is provided an uplink resource scheduling method for a Non-Orthogonal Multiple Access (NOMA) system, applied to a wireless base station, the method comprising: generating group dedicated signaling respectively for mobile station groups managed by the wireless base station, wherein group dedicated signaling of each mobile station group indicates uplink resources allocated to the mobile station group; multiplexing the generated group dedicated signaling into different positions of a first channel and transmitting the multiplexed group dedicated signaling; generating mobile station dedicated signaling for each mobile station in each mobile station group, wherein the mobile station dedicated signaling at least includes group information indicating the mobile station group to which the mobile station belongs; and multiplexing the generated mobile station dedicated signaling into a second channel and transmitting the multiplexed mobile station dedicated signaling.

According to another embodiment of the present invention, there is provided an uplink resource scheduling method for a Non-Orthogonal Multiple Access (NOMA) system, applied to a mobile station, the method comprising: detecting group dedicated signaling of respective mobile station groups managed by a wireless base station, which are transmitted by the wireless base station by using a first channel, wherein group dedicated signaling of each mobile station group indicates uplink resources allocated to the mobile station group; detecting mobile station dedicated signaling transmitted by the wireless base station by using a second channel, wherein the mobile station dedicated signaling at least includes group information indicating the mobile station group to which the mobile station belongs; determining a position of group dedicated signaling of the mobile station group to which the mobile station belongs in the first channel based on the group information, to obtain the group dedicated signaling of the mobile station group to which the mobile station belongs in the determined position, when the group dedicated signaling and the mobile station dedicated signaling is detected; and determining the uplink resources allocated to the mobile station group to which the mobile station belongs based on the group dedicated signaling of the mobile station group to which the mobile station belongs.

According to still another embodiment of the present invention, there is provided a wireless base station for a non-orthogonal multiple access (NOMA) system, comprising: a group dedicated signaling generating unit, configured to generate group dedicated signaling for each mobile station group managed by the wireless base station, wherein the group dedicated signaling indicates uplink resources allocated to the mobile station group; a mobile station dedicated signaling generating unit, configured to generate mobile station dedicated signaling for each mobile station in each mobile station group, wherein the mobile station dedicated signaling at least includes group information indicating the mobile station group to which the mobile station belongs; and a transmitting unit, configured to multiplex the generated group dedicated signaling into different positions of a first channel and transmit the multiplexed group dedicated signaling; and further configured to multiplex the generated mobile station dedicated signaling into a second channel and transmit the multiplexed mobile station dedicated signaling.

According to a further embodiment of the present invention, there is provided a mobile station for a non-orthogonal multiple access (NOMA) system, comprising: a receiving unit, configured to detect group dedicated signaling of respective mobile station groups managed by a wireless base station, which are transmitted by the wireless base station by using a first channel, and detect mobile station dedicated signaling transmitted by the wireless base station by using a second channel, wherein group dedicated signaling of each mobile station group indicates uplink resources allocated to the mobile station group, and the mobile station dedicated signaling at least includes group information indicating the mobile station group to which the mobile station belongs; an information obtaining unit configured to determine a position of group dedicated signaling of the mobile station group to which the mobile station belongs in the first channel based on the group information, to obtain the group dedicated signaling of the mobile station group to which the mobile station belongs in the determined position, when the group dedicated signaling and the mobile station dedicated signaling is detected; and a resource determining unit, configured to determine the uplink resources allocated to the mobile station group to which the mobile station belongs based on the group dedicated signaling of the mobile station group to which the mobile station belongs.

In a case where there are a large number of mobile stations simultaneously scheduled by the wireless base station, as compared with the conventional uplink resource scheduling method, the solutions according to the embodiments of the present invention can effectively reduce the signaling overhead required when the wireless base station transmits information indicating the uplink resources allocated to the mobile stations.

DETAILED DESCRIPTION

Hereinafter, preferred embodiments of the present invention will be described in detail with reference to the drawings. It should be noted that, in the description and the drawings, the same reference numerals denote substantially the same steps and elements, and repeated explanation of these steps and elements will be omitted.

Figure 1:
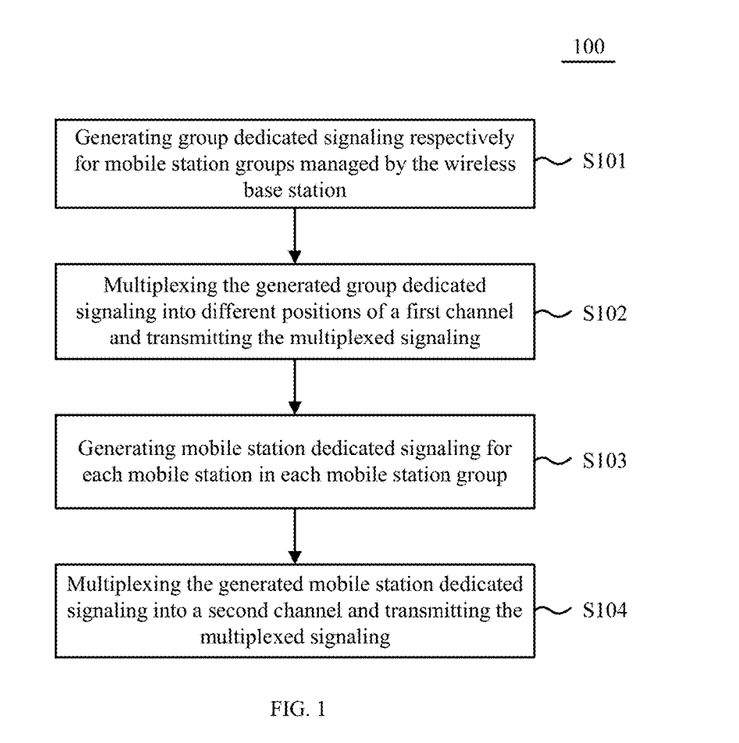
FIG. 1 is a flowchart illustrating an uplink resource scheduling method according to an embodiment of the present invention.

FIG. 1 is a flowchart illustrating an uplink resource scheduling method 100 according to an embodiment of the present invention. More specifically, the uplink resource scheduling method 100 may be applied to a NOMA system, and may be executed by a wireless base station in the NOMA system. Next, the uplink resource scheduling method 100 according to an embodiment of the present invention will be described with reference to FIG. 1.

As shown in FIG. 1, in step S101, for respective mobile station groups managed by the wireless base station, group dedicated signaling is generated respectively. In the NOMA system, the wireless base station may group the mobile stations transmitting scheduling requests thereto in a cell managed by the wireless base station, and allocate identical uplink resources to the mobile stations which belong to the same group. In the embodiment of the present invention, group dedicated signaling of each mobile station group indicates uplink resources allocated to the mobile station group.

In step S102, the generated group dedicated signaling is multiplexed into different positions of a first channel and transmitted. For example, the first channel may be a Physical Downlink Control CHannel (PDCCH), or an Enhanced Physical Downlink Control CHannel (EPDCCH). The first channel can be transmitted in a broadcasting manner. In order that all the mobile stations in each mobile station group can accurately decode the group dedicated signaling of the mobile station group included in the first channel, preferably, in step S102, a channel state of each mobile station in the mobile station group may be determined, to determine a coding rate of the group dedicated signaling of the mobile station group based on the mobile station with the worst channel state, and the group dedicated signaling of the mobile station group is generated based on the determined coding rate. Further, preferably, the position of each group dedicated signaling in the first channel is not adjacent to positions of other group dedicated signaling in the first channel.

According to one example of the present invention, in step S102, firstly, a predetermined position of each group dedicated signaling in the first channel may be firstly determined according to a predetermined position mode. Then in the first channel, the group dedicated signaling is transmitted in the predetermined position of the group dedicated signaling. For example, the predetermined position of each group dedicated signaling in the first channel may be a starting position of the group dedicated signaling in the first channel.

Figure 2:
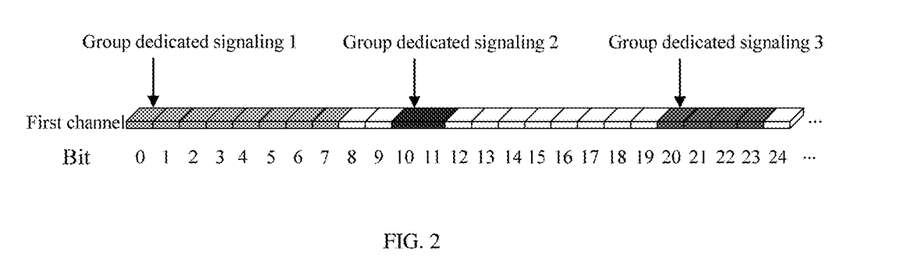
FIG. 2 is an explanatory diagram illustrating an exemplary scenario where group dedicated signaling is transmitted in a predetermined position of each group dedicated signaling.

FIG. 2 is an explanatory diagram illustrating an exemplary scenario where group dedicated signaling is transmitted in a predetermined position of each group dedicated signaling. In the exemplary scenario illustrated in FIG. 2, it is assumed that the wireless base station can manage three mobile station groups. In the predetermined position mode, it may be predetermined that a starting position of group dedicated signaling 1 of a mobile station group 1 in the first channel is the $0^{th}$ bit of the first channel, a starting position of group dedicated signaling 2 of a mobile station group 2 in the first channel is the $10^{th}$ bit of the first channel, and a starting position of group dedicated signaling 3 of a mobile station group 3 in the first channel is the $20^{th}$ bit of the first channel. In step S102, the starting positions of group dedicated signaling 1-3 in the first channel may be firstly determined according to the predetermined position mode. Then as shown in FIG. 2, in the first channel, the group dedicated signaling 1 is transmitted in the position which starts from the $0^{th}$ bit, the group dedicated signaling 2 is transmitted in the position which starts from the $10^{th}$ bit, and the group dedicated signaling 3 is transmitted in the position which starts from the $20^{th}$ bit.

According to another example of the present invention, in order to prevent prolonged occupation of the same downlink resources by the group dedicated signaling, in step S102, in addition to determining the predetermined position of each group dedicated signaling in the first channel according to the predetermined position mode, a displacement amount changing with time may also be determined. The wireless base station may notify the mobile station a corresponding relationship between the displacement amount and time in advance. Alternatively, the corresponding relationship between the displacement amount and the time consistent with a corresponding relationship used in the wireless base station may be pre-stored in the mobile station. Then, based on the displacement amount and the predetermined position of each group dedicated signaling, a multiplexing position of each group dedicated signaling in the first channel is determined. For example, in the first channel, the predetermined position may be moved forward or backward by the determined displacement amount to obtain a multiplexing position. Finally, in the first channel, the group dedicated signaling is transmitted in the multiplexing position of each group dedicated signaling.

Figure 3A:
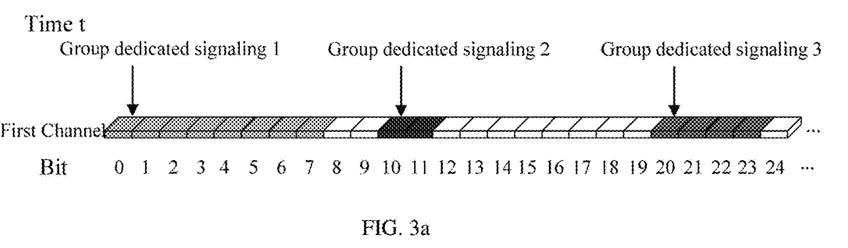
FIGS. 3*a* and 3*b* are explanatory diagrams illustrating an exemplary scenario where the group dedicated signaling is transmitted in a multiplexing position of each group dedicated signaling.
Figure 3B:
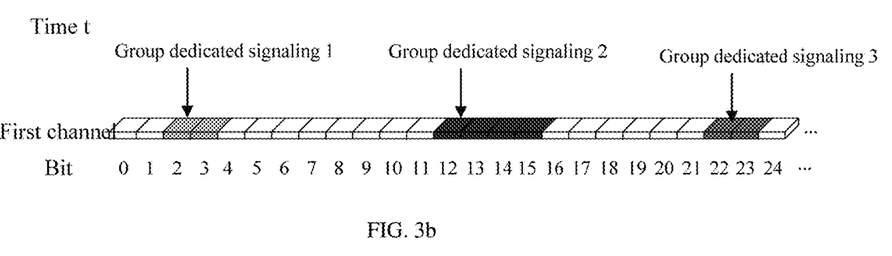

FIGS. 3a and 3b are explanatory diagrams illustrating an exemplary scenario where group dedicated signaling is transmitted in a multiplexing position of each group dedicated signaling. Similar to the exemplary scenario shown in FIG. 2, in the exemplary scenario shown in FIG. 3, it is assumed that the wireless base station can manage three mobile station groups, and the predetermined position of each group dedicated signaling in the first channel may be a starting position of the group dedicated signaling in the first channel. In the predetermined position mode, it may be predetermined that a starting position of a group dedicated signaling 1 of a mobile station group 1 in the first channel is the $0^{th}$ bit of the first channel, a starting position of a group dedicated signaling 2 of a mobile station group 2 in the first channel is the $10^{th}$ bit of the first channel, and a starting position of a group dedicated signaling 3 of a mobile station group 3 in the first channel is the $20^{th}$ bit of the first channel. In step S102, the starting positions of group dedicated signaling 1-3 in the first channel may be firstly determined, according to the predetermined position mode, as the $0^{th}$ bit, the $10^{th}$ bit and the $20^{th}$ bit.

Further, in the examples shown in FIG. 3a and FIG. 3b, in the first channel, the displacement amount of the group dedicated signaling changing with time is also determined. For example, the displacement amount may be proportional to the time elapsed from a specific time point. In the examples shown in FIG. 3a and FIG. 3b, time t is the above-mentioned specific time point. In step S102, the starting positions of the group dedicated signaling 1-3 in the first channel may be firstly determined according to the predetermined position mode, and the displacement amount at time t is determined as zero. Then, since the displacement amount is zero, it can be determined that the multiplexing position of each group dedicated signaling in the first channel is the same with the starting position of the group dedicated signaling. Finally, as shown in FIG. 3a, in the first channel, the group dedicated signaling 1 is transmitted in the position which starts from the $0^{th}$ bit, the group dedicated signaling 2 is transmitted in the position which starts from the $10^{th}$ bit, and the group dedicated signaling 3 is transmitted in the position which starts from the $20^{th}$ bit. On the other hand, time t' is a time point when a time period $t_c$ is elapsed from the time t. In step S102, the starting positions of the group dedicated signaling 1-3 in the first channel may be firstly determined according to the predetermined position mode, and the displacement amount corresponding to the time period $t_c$ may be determined as 2 bits, based on a relationship between the predetermined displacement amount and the time elapsed from the specific time point. Then, since the displacement amount is 2 bits, it can be determined that the multiplexing position of each group dedicated signaling in the first channel is a position obtained by moving the group dedicated signaling backward by 2 bits from the starting position. Finally, as shown in FIG. 3b, in the first channel, the group dedicated signaling 1 is transmitted in the position where the $2^{nd}$ bit starts, the group dedicated signaling 2 is transmitted in the position where the $12^{th}$ bit starts, and the group dedicated signaling 3 is transmitted in the position where the $22^{nd}$ bit starts.

Returning to FIG. 1, in step S103, for each mobile station in each mobile station group, mobile station dedicated signaling is generated. In the embodiment of the present invention, the mobile station dedicated signaling at least includes group information indicating the mobile station group to which the mobile station belongs. According to one example of the present invention, the method shown in FIG. 1 may also comprise numbering the respective mobile station groups respectively. The group information may include a serial number of a mobile station group to which a mobile station belongs to indicate the mobile station group to which the mobile station belongs. Further, in this case, in the above-mentioned predetermined position mode, the predetermined position of the group dedicated signaling of the mobile station group may be indicated by a position corresponding to the serial number of the mobile station group in the first channel.

Finally, in step S104, the generated mobile station dedicated signaling is multiplexed into a second channel and transmitted. Similar to the first channel, in a communication system before Release 11, the second channel may be a PDCCH. In addition, in a communication system after the Release 11, the second channel may be an EPDCCH. The generated mobile station dedicated signaling may be multiplexed into different positions of the second channel, and the second channel is transmitted in a broadcasting manner.

By using the uplink resource scheduling method according to the above-described embodiment of the present invention, in a case where there are a relatively large number of mobile stations simultaneously scheduled by the wireless base station, the signaling overhead required when the wireless base station transmits the information indicating the uplink resources allocated to the mobile stations can be effectively reduced. Further, in the examples shown in FIG. 2 and FIG. 3, the wireless base station multiplexes the generated plurality of group dedicated signaling into the predetermined position in the first channel according to the predetermined position mode and transmits the multiplexed group dedicated signaling, so that the mobile station can determine a position of the group dedicated signaling of the mobile station group to which the mobile station belongs in the first channel according to the predetermined position mode, which thereby can reduce a number of times necessary to perform blind decoding when the mobile station determines the uplink resources allocated to the mobile station, and simplify operation required to be executed by the mobile station.

In addition, for the uplink resources allocated to the mobile station by the wireless base station, sometimes there may be a case where the transmission power of the mobile station in a specific resource block reaches the maximum, so that the resource block is non-serviceable. To solve the above-described problem, according to another example of the present invention, in step S101, the wireless base station may determine, based on the transmission power of the mobile station, whether there is a non-serviceable uplink resource for the mobile station in the uplink resources allocated to the mobile station group to which the mobile station belongs. Specifically, after the wireless base station groups the mobile stations transmitting scheduling requests thereto in a cell managed by the wireless base station, and initially allocates the uplink resources to each mobile station group, the wireless base station may determine, based on a transmission power of a mobile station, whether there is a non-serviceable uplink resource for the mobile station in the uplink resources allocated to the mobile station group to which the mobile station belongs. When there is a non-serviceable uplink resource for the mobile station, the wireless base station may further divide the mobile station group to which the mobile station belongs into a first mobile station group including the mobile station and a second mobile station group not including the mobile station; and generate group dedicated signaling for the first mobile station group and the second mobile station group respectively, wherein group dedicated signaling of the second mobile station group indicates the uplink resources identical with those allocated to the mobile station group before the dividing, and group dedicated signaling of the first mobile station group indicates the uplink resources identical with those allocated to the mobile station group before the dividing, except the non-serviceable uplink resource for the mobile station. On the other hand, for the mobile station group in which there is no mobile station incapable of using the allocated uplink resources, in step S101, group dedicated signaling may be directly generated for such a mobile station group.

In the method of this example, the wireless base station adjusts the mobile station group and the uplink resources allocated to the mobile station group based on a reception power of the mobile station, so as to avoid existence of non-serviceable resource block in the plurality of uplink resource blocks allocated to the mobile station.

Figure 4:
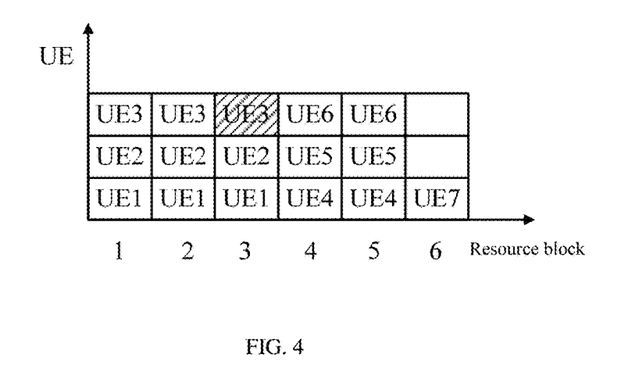
FIG. 4 is an explanatory diagram illustrating an exemplary scenario where there is a non-serviceable resource block for the mobile station in the uplink resources initially allocated to the mobile station by the wireless base station.

FIG. 4 is an explanatory diagram illustrating an exemplary scenario where there is a non-serviceable resource block for the mobile station in the uplink resources initially allocated to the mobile station by the wireless base station. In the example shown in FIG. 4, the wireless base station divides mobile stations (UEs) 1-7 transmitting scheduling requests thereto in a cell managed by the wireless base station into three groups, i.e., mobile station groups A, B and C, wherein the group A includes UE1, UE2 and UE3, the group B includes UE4, UE5 and UE6, and the group C includes UE7. Initially, the wireless base station allocates uplink resource blocks 1, 2 and 3 to the group A, allocates uplink resource blocks 4 and 5 to the group B, and allocates an uplink resource block 6 to the group C. The wireless base station may determine, based on a transmission power of the mobile station, whether there is a non-serviceable uplink resource for the mobile station in the uplink resources allocated to the mobile station group to which the mobile station belongs. As shown in a shadow portion in FIG. 4, the transmission power of UE3 reaches the maximum in the resource block 3, such that the resource block 3 is non-serviceable for the UE3. In this case, as described above, the wireless base station may further divide the group A to which the UE3 belongs into a first mobile station group A1 including the mobile station and a second mobile station group A2 not including the mobile station; and respectively generate group dedicated signaling for the first mobile station group A1 and the second mobile station group A2, wherein group dedicated signaling of the second mobile station group A2 indicates the uplink resource blocks 1-3 identical with those allocated to the group A, and group dedicated signaling of the first mobile station group A1 indicates the uplink resources, i.e., the uplink resource blocks 2 and 3, identical with those allocated to the mobile station group before the dividing, except the uplink resource block 3 non-serviceable for the mobile station.

In addition, in a case where the mobile stations transmitting the scheduling requests to the wireless base station include the mobile stations using the conventional communication standard (e.g. the Release 8 standard) and the mobile stations using the NOMA standard, the wireless base station may schedule the uplink resources for the mobile stations using different standards by a conventional uplink resource scheduling method, and may also schedule the uplink resources for the mobile stations by the method 100 as shown in FIG. 1. Preferably, the wireless base station can transmit scheduling method indicating information to the mobile stations, to indicate the uplink resource scheduling method used thereby. Alternatively, the wireless base station may schedule the uplink resources for the mobile stations using the NOMA standard by the method 100 as shown in FIG. 1, and schedule the uplink resources for the mobile stations using the conventional communication standard by the conventional uplink resource scheduling method. The conventional uplink resource scheduling method may include generating and transmitting a resource allocation signaling. In the embodiment of the present invention, the resource allocation signaling may be signaling indicating uplink resources allocated to the mobile station in the conventional uplink resource scheduling method. Preferably, the resource allocation signaling may be transmitted in channel resources unoccupied by the group dedicated signaling in the first channel, so that the wireless base station can serve both the mobile stations using the conventional communication standard and the mobile stations using the NOMA standard in the same sub-frame.

Hereinafter, an uplink resource scheduling method executed by the mobile station corresponding to the uplink resource scheduling method 100 in FIG. 1 executed by the wireless base station will be described in conjunction with FIG. 5. Next, only the main steps of the uplink resource scheduling method executed by the mobile station will be described, and the detailed contents which have been described above in conjunction with FIG. 1 will be omitted.

Figure 5:
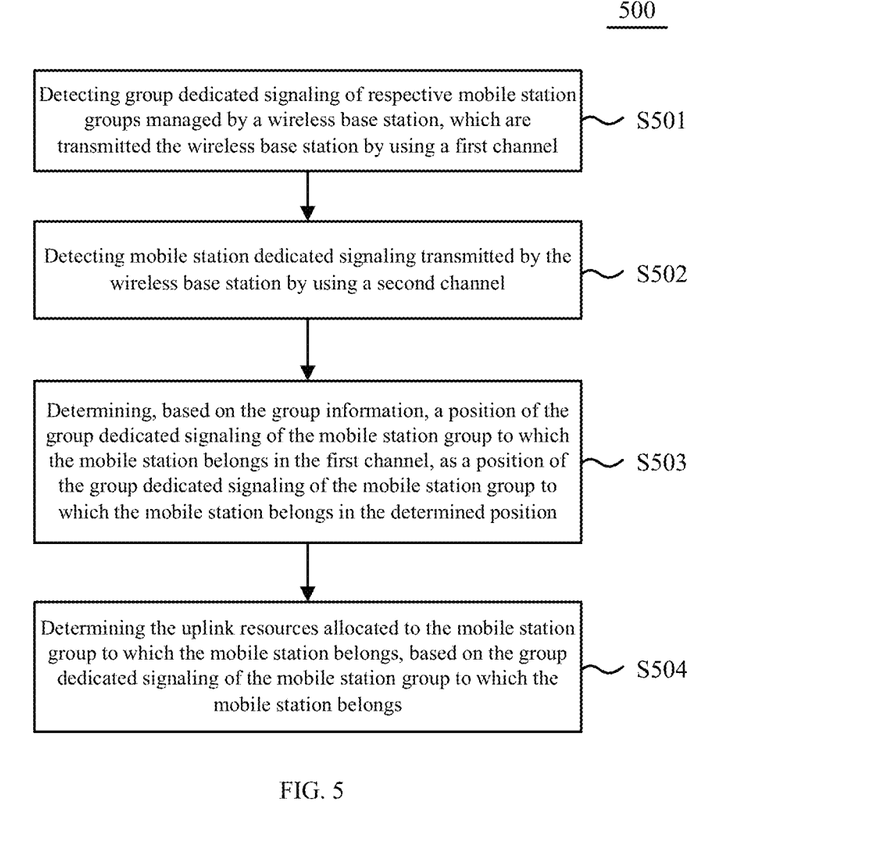
FIG. 5 is a flowchart illustrating an uplink resource scheduling method according to another embodiment of the present invention.

FIG. 5 is a flowchart illustrating an uplink resource scheduling method 500 according to another embodiment of the present invention. As shown in FIG. 5, in step S501, group dedicated signaling of respective mobile station groups managed by a wireless base station, which is transmitted by the wireless base station by using a first channel, is detected. As described above, group dedicated signaling of each mobile station group indicates uplink resources allocated to the mobile station group.

In step S502, mobile station dedicated signaling transmitted by the wireless base station by using a second channel is detected. As described above, the mobile station dedicated signaling at least includes group information indicating the mobile station group to which the mobile station belongs. For example, in a case where the wireless base station numbers the mobile station groups, the group information may include a serial number of a mobile station group to which a mobile station belongs to indicate the mobile station group to which the mobile station belongs.

Then, in step S503, when the group dedicated signaling and the mobile station dedicated signaling is detected, a position of the group dedicated signaling of the mobile station group to which the mobile station belongs in the first channel is determined based on the group information, to obtain the group dedicated signaling of the mobile station group to which the mobile station belongs in the determined position. According to one example of the present invention, in step S503, based on the group information, a predetermined position of the group dedicated signaling of the mobile station group to which the mobile station belongs in the first channel may be determined according to a predetermined position mode, as a position of the group dedicated signaling of the mobile station group to which the mobile station belongs in the first channel. The predetermined position mode has been described above, which will not be repeated here. For example, in the example shown in FIG. 2, when the mobile station dedicated signaling indicates that the mobile station belongs to the mobile station group 1, the group dedicated signaling starting from the $0^{th}$ bit in the first channel may be obtained in step S503. When the mobile station dedicated signaling indicates that the mobile station belongs to the mobile station group 2, the group dedicated signaling starting from the $10^{th}$ bit in the first channel may be obtained in step S503. In addition, when the mobile station dedicated signaling indicates that the mobile station belongs to the mobile station group 3, the group dedicated signaling starting from the $20^{th}$ bit in the first channel may be obtained in step S503.

Further, according to another example of the present invention, in order to prevent prolonged occupation of the same downlink resources by the group dedicated signaling, the wireless base station may change with time the position where the group dedicated signaling is transmitted in the first channel. In this case, in step S503, in addition to determining, based on the group information, the predetermined position of the group dedicated signaling of the mobile station group to which the mobile station belongs in the first channel according to a predetermined position mode, a displacement amount changing with time may also be determined, and a multiplexing position of the group dedicated signaling of the mobile station group to which the mobile station belongs in the first channel is determined based on the displacement amount and the determined predetermined position, as a position of the group dedicated signaling of the mobile station group to which the mobile station belongs in the first channel. In addition, the mobile station may receive a corresponding relationship between the displacement amount and time from the wireless base station in advance. Alternatively, the corresponding relationship between the displacement amount and the time may also be pre-stored in the mobile station. In addition, the mobile station may move the predetermined position forward or backward by the determined displacement amount in the first channel to obtain the multiplexing position.

For example, in the example shown in FIG. 3b, in step S503, it may be determined that the displacement amount at time t' is 2 bits, and when the mobile station dedicated signaling indicates that the mobile station belongs to the mobile station group 1, the group dedicated signaling starting from the $2^{nd}$ bit in the first channel is obtained. When the mobile station dedicated signaling indicates that the mobile station belongs to the mobile station group 2, the group dedicated signaling starting from the $12^{th}$ bit in the first channel is obtained. In addition, when the mobile station dedicated signaling indicates that the mobile station belongs to the mobile station group 3, the group dedicated signaling starting from the $22^{nd}$ bit in the first channel is obtained.

In addition, in a case where the wireless base station will number the mobile station groups, in the predetermined position mode, the predetermined position of the group dedicated signaling of the mobile station group may be indicated by a position corresponding to the serial number of the mobile station group in the first channel. In step S503, based on the serial number of the mobile station group to which the mobile station belongs, the predetermined position of the group dedicated signaling of the mobile station group to which the mobile station belongs in the first channel may be determined according to the predetermined position mode.

Finally, in step S504, based on the group dedicated signaling of the mobile station group to which the mobile station belongs, the uplink resources allocated to the mobile station group to which the mobile station belongs are determined.

By using the uplink resource scheduling method according to the above-described embodiment of the present invention, in a case where there are a relatively large number of mobile stations simultaneously scheduled by the wireless base station, the signaling overhead required when the mobile stations receive the information indicating uplink resources allocated to the mobile stations from the wireless base station can be effectively reduced. In addition, the wireless base station multiplexes the generated plurality of group dedicated signaling into the predetermined position in the first channel and transmits the signaling according to the predetermined position mode, so that the mobile station can determine a position of the group dedicated signaling of the mobile station group to which the mobile station belongs in the first channel according to the predetermined position mode, which thereby can reduce a number of times necessary to perform blind decoding when the mobile station determines the uplink resources allocated to the mobile station, and simplify operation required to be executed by the mobile station.

Further, in a case where the mobile station is uncertain of whether the wireless base station schedules the uplink resources by using the method 100 shown in FIG. 1, or schedules the uplink resources by using the conventional method, the method shown in FIG. 5 may also comprise detecting a resource allocation signaling transmitted by the wireless base station. As described above, the resource allocation signaling may be signaling indicating the uplink resources allocated to the mobile station in the conventional uplink resource scheduling method. And when the resource allocation signaling is detected, the uplink resources allocated to the mobile station are determined based on the resource allocation signaling. Thus, the mobile station can determine the uplink resources that the wireless base station allocates thereto, whether the wireless base station schedules the uplink resources by the method 100 shown in FIG. 1, or schedules the uplink resources by the conventional method. Further, optionally, the wireless base station may, before scheduling the uplink resources, notify the mobile station whether it schedules the uplink resources by the method 100 shown in FIG. 1, or schedules the uplink resources by the conventional method. In this case, the method shown in FIG. 5 may also comprise receiving scheduling method indicating information; and determining whether to detect the group dedicated signaling and the mobile station dedicated signaling, or to detect the resource allocation signaling based on the scheduling method indicating information. Then, based on a determination result, a corresponding method is executed to determine the uplink resources allocated to the mobile station.

Further, according to another example of the present invention, the mobile station may detect the wireless communication network where it is located, and when it is detected that the mobile station switches from the existing wireless communication network to the NOMA communication network, the mobile station may switch from using the conventional method to using the method 500 shown in FIG. 5 to determine the uplink resources allocated thereto by the wireless base station. On the other hand, when the mobile station detects that the NOMA communication network is switched to the existing wireless communication network, the mobile station may switch from using the method 500 shown in FIG. 5 to using the conventional method, to determine the uplink resources allocated thereto by the wireless base station. Thus, the mobile station can switch to the appropriate uplink resource scheduling method based on the communication network where it is currently located, whether it complies with the conventional communication standard or the NOMA standard, so as to effectively obtain the uplink resources allocated thereto by the wireless base station.

Figure 6:
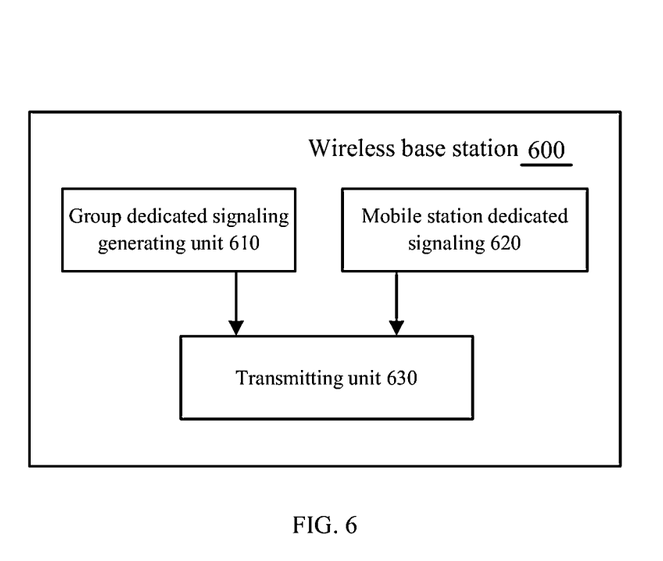
FIG. 6 is an exemplary structural block diagram illustrating a wireless base station according to an embodiment of the present invention.

Next, with reference to FIG. 6, a wireless base station for a NOMA system according to an embodiment of the present invention is illustrated. FIG. 6 is an exemplary structural block diagram illustrating a wireless base station 600 according to an embodiment of the present invention. As shown in FIG. 6, the wireless base station 600 according to this embodiment comprises a group dedicated signaling generating unit 610, a mobile station dedicated signaling generating unit 620 and a transmitting unit 630. The respective units of the wireless base station 600 can respectively execute the respective steps/functions of the above-described mobile communication method 100 in FIG. 1. Therefore, only the main components of the wireless base station 600 will be described hereinafter, and the detailed contents which have been described above in conjunction with FIG. 1 will be omitted.

As described above, in the NOMA system, the wireless base station can group the mobile stations transmitting scheduling requests thereto in a cell managed by the wireless base station, and allocate identical uplink resources to the mobile stations which belong to the same group. The dedicated signaling generating unit 610 may generate group dedicated signaling for respective mobile station groups managed by the wireless base station, respectively, wherein group dedicated signaling of each mobile station group indicates uplink resources allocated to the mobile station group by the wireless base station. On the other hand, the mobile station dedicated signaling generating unit 620 may generate mobile station dedicated signaling for each mobile station in each mobile station group, wherein the mobile station dedicated signaling at least includes group information indicating the mobile station group to which the mobile station belongs. According to one example of the present invention, the wireless base station may comprise a numbering unit, for numbering the respective mobile station groups respectively. In this case, the group information may include a serial number of a mobile station group to which a mobile station belongs to indicate the mobile station group to which the mobile station belongs.

The transmitting unit 630 may multiplex the generated group dedicated signaling into different positions of a first channel and transmit the multiplexed group dedicated signaling. For example, in a communication system before Release 11, the first channel may be a Physical Downlink Control CHannel (PDCCH). For a further example, in a communication system after the Release 11, the first channel may be an Enhanced Physical Downlink Control CHannel (EPDCCH). The first channel can be transmitted in a broadcasting manner. In order that all the mobile stations in each mobile station group can accurately decode the group dedicated signaling of the mobile station group included in the first channel, preferably, the transmitting unit 630 may determine a channel state of each mobile station in the mobile station group, to determine a coding rate of the group dedicated signaling of the mobile station group based on the mobile station with the worst channel state, and generate the group dedicated signaling of the mobile station group based on the determined coding rate. Further, preferably, the position of each group dedicated signaling in the first channel is not adjacent to positions of other group dedicated signaling in the first channel.

Figure 7:
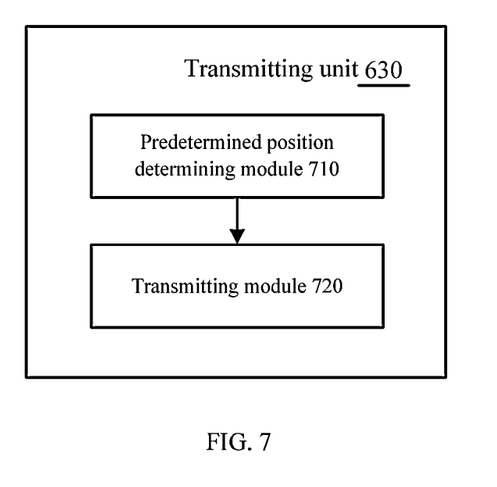
FIG. 7 is an exemplary structural block diagram illustrating a transmitting unit according to an example of the present invention.

FIG. 7 is an exemplary structural block diagram illustrating a transmitting unit according to an example of the present invention. As shown in FIG. 7, the transmitting unit 630 may include a predetermined position determining module 710 and a transmitting module 720. Specifically, the predetermined position determining module 710 may determine a predetermined position of each group dedicated signaling in the first channel according to a predetermined position mode. For example, the predetermined position of each group dedicated signaling in the first channel may be a starting position of the group dedicated signaling in the first channel. Further, as described above, in a case where the wireless base station 600 comprises the numbering unit for numbering the respective mobile station groups respectively, in the predetermined position mode, the predetermined position of the group dedicated signaling of the mobile station group may be indicated by the position corresponding to the serial number of the mobile station group in the first channel. Then, the transmitting module 720 may transmit the group dedicated signaling in the predetermined position of each group dedicated signaling in the first channel.

Figure 8:
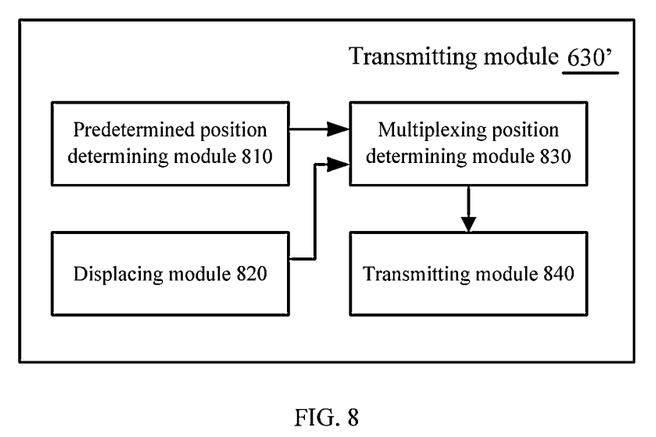
FIG. 8 is an exemplary structural block diagram illustrating a transmitting unit according to another example of the present invention.

According to another example of the present invention, in order to prevent prolonged occupation of the same downlink resources by the group dedicated signaling, when the group dedicated signaling is transmitted, in addition to determining the predetermined position of each group dedicated signaling in the first channel, a displacement amount changing with time may also be determined. FIG. 8 is an exemplary structural block diagram illustrating a transmitting unit 630' according to another example of the present invention. As shown in FIG. 8, the transmitting unit 630' may include a predetermined position determining module 810, a displacing module 820, a multiplexing position determining module 830 and a transmitting module 840. Similar to the predetermined position determining module 710, the predetermined position determining module 810 may determine a predetermined position of each group dedicated signaling in the first channel according to a predetermined position mode. And the displacing module 820 may determine a displacement amount changing with time for the group dedicated signaling in the first channel. Then, the multiplexing position determining module 830 may determine a multiplexing position of each group dedicated signaling in the first channel, based on the displacement amount and the predetermined position of each group dedicated signaling. For example, the multiplexing position determining module 830 may move the predetermined position forward or backward by the determined displacement amount in the first channel to obtain the multiplexing position. Finally, the transmitting module 840 may transmit the group dedicated signaling in the multiplexing position of each group dedicated signaling in the first channel.

In addition, the transmitting unit 630 may also multiplex the generated mobile station dedicated signaling into a second channel and transmit the multiplexed group dedicated signaling. Similar to the first channel, in a communication system before Release 11, the second channel may be a PDCCH. Further, in a communication system after the Release 11, the first channel may be an EPDCCH. The transmitting unit 630 may multiplex the generated mobile station dedicated signaling into different positions of the second channel, and transmit the second channel in a broadcasting manner.

By using the wireless base station according to the above-described embodiment of the present invention, in a case where there are a relatively large number of mobile stations simultaneously scheduled by the wireless base station, the signaling overhead required when the wireless base station transmits the information indicating the uplink resources allocated to the mobile stations can be effectively reduced. Further, in the examples shown in FIG. 7 and FIG. 8, the wireless base station multiplexes the generated plurality of group dedicated signaling into the predetermined position in the first channel according to the predetermined position mode and transmits the signaling, so that the mobile station can determine a position of the group dedicated signaling of the mobile station group to which the mobile station belongs in the first channel according to the predetermined position mode, which thereby can reduce a number of times necessary to perform blind decoding when the mobile station determines the uplink resources allocated to the mobile station, and simplify operation required to be executed by the mobile station.

Figure 9:
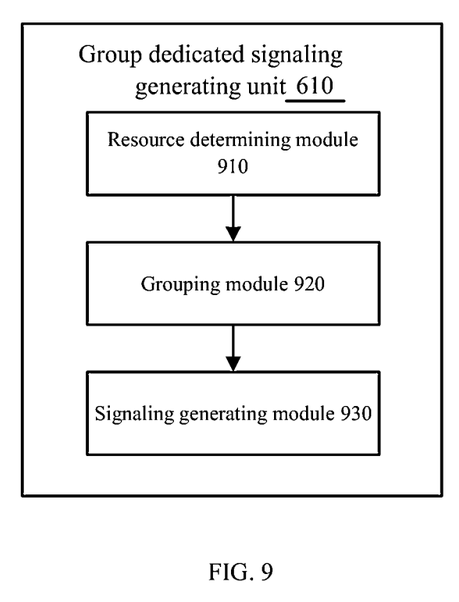
FIG. 9 is an exemplary structural block diagram illustrating group dedicated signaling generating unit according to an example of the present invention.

In addition, to solve the problem that, for the uplink resources allocated to the mobile station by the wireless base station, sometimes there may be a case where the transmission power of the mobile station in a specific resource block reaches the maximum, so that the resource block is non-serviceable, according to another example of the present invention, the wireless base station may determine, based on the transmission power of the mobile station, whether there is a non-serviceable uplink resource for the mobile station in the uplink resources allocated to the mobile station group to which the mobile station belongs. FIG. 9 is an exemplary structural block diagram illustrating group dedicated signaling generating unit according to an example of the present invention. As shown in FIG. 9, the group dedicated signaling generating unit 610 may include a resource determining module 910, a grouping module 920 and a signaling generating module 930. Specifically, the wireless base station may group the mobile stations transmitting scheduling requests thereto in a cell managed by the wireless base station management cell, and initially allocate the uplink resources to each mobile station group. The resource determining module 910 may determine, based on a transmission power of the mobile station, whether there is a non-serviceable uplink resource for the mobile station in the uplink resources allocated to the mobile station group to which the mobile station belongs. When there is a non-serviceable uplink resource for the mobile station, the grouping module 920 divides the mobile station group to which the mobile station belongs into a first mobile station group including the mobile station and a second mobile station group not including the mobile station; and the signaling generating module 930 respectively generates group dedicated signaling for the first mobile station group and the second mobile station group, wherein group dedicated signaling of the second mobile station group indicates the uplink resources identical with those allocated to the mobile station group before the dividing, and group dedicated signaling of the first mobile station group indicates the uplink resources identical with those allocated to the mobile station group before the dividing, except the uplink resource non-serviceable for the mobile station. On the other hand, for the mobile station group in which there is no mobile station incapable of using the allocated uplink resources, the signaling generating module 930 may directly generate group dedicated signaling for such a mobile station group. By using the dedicated signaling generating unit according to this example, the wireless base station adjusts the mobile station group and the uplink resources allocated to the mobile station group based on a reception power of the mobile station, so as to avoid existence of non-serviceable resource block in the plurality of uplink resource blocks allocated to the mobile station.

In addition, the wireless base station may further comprise a resource allocation signaling generating unit. In a case where the mobile stations transmitting the scheduling requests to the wireless base station include the mobile stations using the conventional communication standard (e.g. the Release 8 standard) and the mobile stations using the NOMA standard, the wireless base station may generate the resource allocation signaling by the resource allocation signaling generating unit and transmit the resource allocation signaling by the transmitting unit, to schedule the uplink resources for the mobile stations using different standards. Alternatively, as described above, the wireless base station may generate the group dedicated signaling by the group dedicated signaling generating unit, generate the mobile station dedicated signaling by the mobile station dedicated signaling generating unit, and transmit the group dedicated signaling and the mobile station dedicated signaling by the transmitting unit, to schedule the uplink resources for the mobile stations using different standards. Preferably, the transmitting unit may transmit scheduling method indicating information to the mobile station, to indicate the uplink resource scheduling method used thereby. Alternatively, the wireless base station may generate and transmit the group dedicated signaling and the mobile station dedicated signaling for the mobile stations using the NOMA standard, and generate and transmit the resource allocation signaling for the mobile stations using the conventional communication standard. Preferably, the transmitting unit may transmit the resource allocation signaling in channel resources unoccupied by the group dedicated signaling in the first channel, so that the wireless base station can serve both the mobile stations using the conventional communication standard and the mobile stations using the NOMA standard in the same sub-frame.

Figure 10:
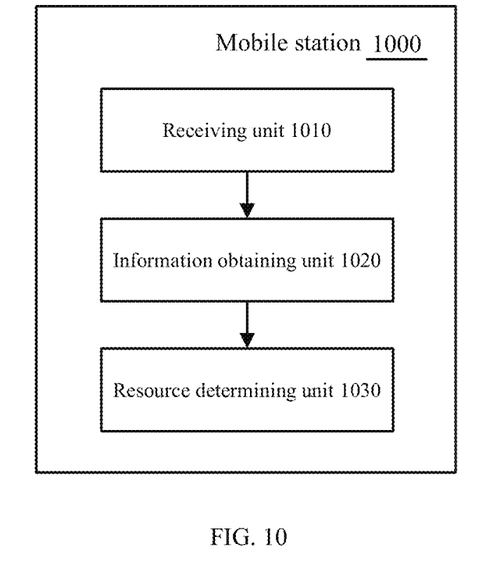
FIG. 10 is an exemplary structural block diagram illustrating a mobile station according to an embodiment of the present invention.

Next, with reference to FIG. 10, a mobile station used for a NOMA system according to an embodiment of the present invention will be illustrated. FIG. 10 is an exemplary structural block diagram illustrating a mobile station 1000 according to an embodiment of the present invention. As shown in FIG. 10, the mobile station 1000 according to this embodiment comprises a receiving unit 1010, an information obtaining unit 1020 and a resource determining unit 1030. The respective units of the mobile station 1000 can respectively execute the respective steps/functions of the above-described mobile communication method 500 in FIG. 5. Therefore, only the main components of the mobile station 1000 will be described hereinafter, and the detailed contents which have been described above in conjunction with FIG. 5 will be omitted.

The receiving unit 1010 may detect group dedicated signaling of respective mobile station groups managed by a wireless base station, which are transmitted by the wireless base station by using a first channel. As described above, group dedicated signaling of each mobile station group indicates uplink resources allocated to the mobile station group. Furthermore, the receiving unit 1010 may further detect mobile station dedicated signaling transmitted by the wireless base station by using a second channel. As described above, the mobile station dedicated signaling at least includes group information indicating the mobile station group to which the mobile station belongs. For example, in a case where the wireless base station numbers the mobile station groups, the group information may include a serial number of a mobile station group to which the mobile station belongs to indicate the mobile station group to which the mobile station belongs.

When the group dedicated signaling and the mobile station dedicated signaling is detected, the information obtaining unit 1020 may determine, based on the group information, a position of the group dedicated signaling of the mobile station group to which the mobile station belongs in the first channel, to obtain the group dedicated signaling of the mobile station group to which the mobile station belongs in the determined position. According to one example of the present invention, the information obtaining unit 1020 may determine, based on the group information, a predetermined position of the group dedicated signaling of the mobile station group to which the mobile station belongs in the first channel according to a predetermined position mode, as a position of the group dedicated signaling of the mobile station group to which the mobile station belongs in the first channel.

Figure 11:
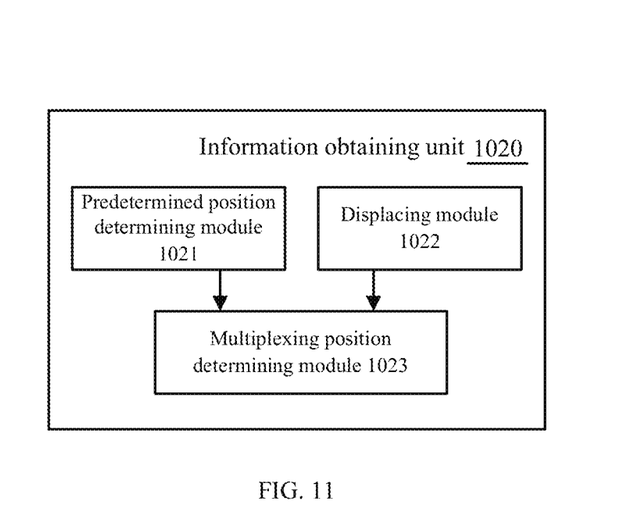
FIG. 11 is an exemplary structural block diagram illustrating a mobile station information obtaining unit according to an example of the present invention.

Further, according to another example of the present invention, in order to prevent prolonged occupation of the same downlink resources by the group dedicated signaling, the wireless base station may change with time the position where the group dedicated signaling is transmitted in the first channel. In this case, in addition to the predetermined position, the information obtaining unit 1020 may also determine a displacement amount changing with time for the group dedicated signaling in the first channel. FIG. 11 is an exemplary structural block diagram illustrating a mobile station information obtaining unit 1020 according to an example of the present invention. As shown in FIG. 11, the information obtaining unit 1020 may include a predetermined position determining module 1021, a displacing module 1022 and a multiplexing position determining module 1023. The predetermined position determining module 1021 may determine, based on the group information, the predetermined position of the group dedicated signaling of the mobile station group to which the mobile station belongs in the first channel according to the predetermined position mode. The displacing module 1022 may determine a displacement amount changing with time. For example, the displacing module 1022 may determine the displacement amount, based on a corresponding relationship between the displacement amount and time received from the wireless base station in advance. For a further example, the displacing module 1022 may determine the displacement amount, based on the corresponding relationship between the displacement amount and the time consistent with a corresponding relationship used in the wireless base station which is pre-stored in the mobile station. The multiplexing position determining module 1023 may determine a multiplexing position of the group dedicated signaling of the mobile station group to which the mobile station belongs in the first channel based on the displacement amount and the determined predetermined position, as a position of the group dedicated signaling of the mobile station group to which the mobile station belongs in the first channel. For example, the multiplexing position determining module 1023 may move the predetermined position forward or backward by the determined displacement amount in the first channel to obtain the multiplexing position.

In addition, in a case where the wireless base station will number the mobile station groups, in the predetermined position mode, the predetermined position of the group dedicated signaling of the mobile station group may be indicated by a position corresponding to the serial number of the mobile station group in the first channel. The information obtaining unit 1020 may determine, based on the serial number of the mobile station group to which the mobile station belongs, the predetermined position of the group dedicated signaling of the mobile station group to which the mobile station belongs in the first channel according to the predetermined position mode.

Returning to FIG. 10, finally, the resource determining unit 1030 may determine, based on the group dedicated signaling of the mobile station group to which the mobile station belongs, the uplink resources allocated to the mobile station group to which the mobile station belongs.

By using the mobile station according to the above-described embodiment of the present invention, in a case where there are a relatively large number of mobile stations simultaneously scheduled by the wireless base station, the signaling overhead required when the mobile stations receive the information indicating the uplink resources allocated to the mobile stations from the wireless base station can be effectively reduced. In addition, the mobile station multiplexes the generated plurality of group dedicated signaling into the predetermined position in the first channel and transmits the signaling according to the predetermined position mode, so that the mobile station can determine the position of the group dedicated signaling of the mobile station group to which the mobile station belongs in the first channel according to the predetermined position mode, which thereby can reduce a number of times necessary to perform blind decoding when the mobile station determines the uplink resources allocated to the mobile station, and simplify operation required to be executed by the mobile station.

Furthermore, according to one example of the present invention, in a case the mobile station is uncertain of whether the wireless base station schedules the uplink resources by using the method 100 shown in FIG. 1, or schedules the uplink resources by using the conventional method, the receiving unit 1010 may further detect a resource allocation signaling transmitted by the wireless base station. In the embodiment of the present invention, the resource allocation signaling may be a signaling indicating the uplink resources allocated to the mobile station in the conventional uplink resource scheduling method. And when the resource allocation signaling is detected, the information obtaining unit 1020 may determine the uplink resources allocated to the mobile station, based on the resource allocation signaling. Thus, the mobile station can determine the uplink resources allocated thereto, whether the wireless base station schedules the uplink resources by the method 100 shown in FIG. 1 or schedules the uplink resources by the conventional method. Further, optionally, the wireless base station may, before scheduling the uplink resources, notify the mobile station whether it schedules the uplink resources by the method 100 shown in FIG. 1, or schedules the uplink resources by the conventional method. In this case, the receiving unit 1010 may further receive scheduling method indicating information, and determine whether to detect the group dedicated signaling and the mobile station dedicated signaling, or to detect the resource allocation signaling based on the scheduling method indicating information. Then, the receiving unit 1010 may determine, based on a determination result, whether to detect the group dedicated signaling and the mobile station dedicated signaling, or to detect the resource allocation signaling.

Further, according to another example of the present invention, the mobile station may detect the wireless communication network where it is located, and when it is detected that the mobile station switches from the existing wireless communication network to the NOMA communication network, the receiving unit 1010 may switch from detecting the resource allocation signaling to detecting the group dedicated signaling and the mobile station dedicated signaling, and the information obtaining unit 1020 may switch from determining the uplink resources allocated to the mobile station based on the resource allocation signaling to determining the uplink resources allocated to the mobile station based on the group dedicated signaling and the mobile station dedicated signaling. On the other hand, when the mobile station detects that the NOMA communication network is switched to the existing wireless communication network, the receiving unit 1010 and the information obtaining unit 1020 may perform the switching conversely. Thus, the mobile station can switch to the appropriate uplink resource scheduling method based on the communication network where it is currently located, whether it complies with the conventional communication standard or the NOMA standard, so as to effectively obtain the uplink resources allocated thereto by the wireless base station.

It should be noted that the respective steps of the method shown in FIG. 1 and FIG. 5 need not to be executed in the order shown. Some steps may be executed conversely or concurrently. For example, in the method 100 shown in FIG. 1, the step of generating the group dedicated signaling (S101) and the step of multiplexing the generated group dedicated signaling into different positions of the first channel and transmitting the multiplexed group dedicated signaling (S102) may be executed concurrently with the step of generating the mobile station dedicated signaling (S103) and the step of multiplexing the generated mobile station dedicated signaling into the second channel and transmitting the multiplexed mobile station dedicated signaling (S104), or step S103 and step S104 may be executed first, and then step S101 and step S102. For example, in the method 500 shown in FIG. 5, the step of detecting the group dedicated signaling (S501) may be executed concurrently with the step of detecting the mobile station dedicated signaling (S502), or step S502 may be executed first, and then step S501.

Those ordinarily skilled in the art may be aware of that, the units, modules and algorithm steps according to various examples described in conjunction with the embodiments in the present disclosure, may be implemented by electronic hardware, computer software, or a combination thereof. And the computer software may be placed in any form of computer storage media. To clearly illustrate interchangeability of the hardware and the software, the compositions and steps according to various examples have been generally described according to the functions in the above description. It depends on specific applications and design constraints of the technical solutions whether these functions are executed by hardware or software. Those skilled in the art may implement the functions described by different methods for each specific application; however, such implementation shall not be deemed as going beyond the scope of the present invention.

Those skilled in the art will appreciate that, various modifications, combinations, partial combinations and replacements may be performed on the present invention, depending on design requirements and other factors, as long as they are within the scope of the appended claims and equivalents thereof.

What is claimed is:
1. An uplink resource scheduling method for a Non-Orthogonal Multiple Access (NOMA) system, applied to a wireless base station, the method comprising:
generating group dedicated signaling respectively for mobile station groups managed by the wireless base station, wherein at least one mobile station group of the mobile station groups includes a plurality of mobile stations and group dedicated signaling of each mobile station group indicates uplink resources allocated to the mobile station group, and wherein generating group dedicated signaling respectively for mobile station groups managed by the wireless base station includes:
determining a channel state of each mobile station in the mobile station group, and determining a coding rate of the group dedicated signaling of the mobile station group based on a mobile station with a worst channel state, and
generating the group dedicated signaling of the mobile station group based on the determined coding rate;
multiplexing the generated group dedicated signaling into different positions of a first channel and transmitting the multiplexed group dedicated signaling;
generating mobile station dedicated signaling for each mobile station in each of the mobile station groups, wherein the mobile station dedicated signaling at least includes group information indicating the mobile station group to which the mobile station belongs; and
multiplexing the generated mobile station dedicated signaling into a second channel and transmitting the multiplexed mobile station dedicated signaling.

2. The method according to claim 1, wherein multiplexing the generated group dedicated signaling into different positions of a first channel and transmitting the multiplexed group dedicated signaling includes:
   determining a predetermined position of each group dedicated signaling in the first channel according to a predetermined position mode; and
   transmitting each group dedicated signaling in the predetermined position of the group dedicated signaling in the first channel.

3. The method according to claim 1, wherein multiplexing the generated group dedicated signaling into different positions of a first channel and transmitting the multiplexed group dedicated signaling includes:
   determining a predetermined position of each group dedicated signaling in the first channel according to a predetermined position mode;
   determining a displacement amount changing with time;
   determining a multiplexing position of each group dedicated signaling in the first channel based on the displacement amount and the predetermined position of each group dedicated signaling; and
   transmitting each group dedicated signaling in the multiplexing position of the group dedicated signaling in the first channel.

4. The method according to claim 2, further comprising:
   numbering the mobile station groups respectively, wherein
   in the predetermined position mode, the predetermined position of the group dedicated signaling of the mobile station group is indicated by a position in the first channel corresponding to a serial number of the mobile station group, and
   the group information includes the serial number of the mobile station group to which the mobile station belongs.

5. The method according to claim 1, wherein
   the position of each group dedicated signaling in the first channel is not adjacent to positions of other group dedicated signaling in the first channel.

6. The method according to claim 1, wherein generating group dedicated signaling respectively for mobile station groups managed by the wireless base station, includes:
   determining, based on a transmission power of a mobile station, whether there is a non-serviceable uplink resource for the mobile station in the uplink resources allocated to the mobile station group to which the mobile station belongs;
   dividing the mobile station group to which the mobile station belongs into a first mobile station group including the mobile station and a second mobile station group not including the mobile station, when there is a non-serviceable uplink resource for the mobile station; and
   generating group dedicated signaling for the first mobile station group and the second mobile station group respectively, wherein a group dedicated signaling of the second mobile station group indicates the uplink resource identical with those allocated to the mobile station group before the dividing, and a group dedicated signaling of the first mobile station group indicates the uplink resource identical with those allocated to the mobile station group before the dividing, except the non-serviceable uplink resource for the mobile station.

7. The method according to claim 1, wherein
   the first channel and the second channel are physical downlink control channels; or
   the first channel and the second channel are enhanced physical downlink control channels.

8. An uplink resource scheduling method for a Non-Orthogonal Multiple Access (NOMA) system, applied to a mobile station, the method comprising:
   detecting group dedicated signaling of respective mobile station groups managed by a wireless base station, which are transmitted by the wireless base station by using a first channel, wherein at least one mobile station group of the mobile station groups includes a plurality of mobile stations and a group dedicated signaling of each mobile station group indicates uplink resources allocated to the mobile station group, and wherein the group dedicated signaling of respective mobile station groups managed by the wireless base station is generated by:
      determining a channel state of each mobile station in the mobile station group, and determining a coding rate of the group dedicated signaling of the mobile station group based on a mobile station with a worst channel state, and
      generating the group dedicated signaling of the mobile station group based on the determined coding rate;
   detecting a mobile station dedicated signaling transmitted by the wireless base station by using a second channel, wherein the mobile station dedicated signaling at least includes group information indicating the mobile station group to which the mobile station belongs;
   determining a position of a group dedicated signaling of the mobile station group to which the mobile station belongs in the first channel based on the group information, to obtain the group dedicated signaling of the mobile station group to which the mobile station belongs in the determined position, when the group dedicated signaling and the mobile station dedicated signaling is detected; and
   determining the uplink resources allocated to the mobile station group to which the mobile station belongs based on the group dedicated signaling of the mobile station group to which the mobile station belongs.

9. The method according to claim 8, wherein determining a position of a group dedicated signaling of the mobile station group to which the mobile station belongs in the first channel based on the group information, includes:
   determining, based on the group information, a predetermined position of the group dedicated signaling of the mobile station group to which the mobile station belongs in the first channel according to a predetermined position mode, as a position of the group dedicated signaling of the mobile station group to which the mobile station belongs in the first channel.

10. The method according to claim 8, wherein determining a position of the group dedicated signaling of the mobile station group to which the mobile station belongs in the first channel based on the group information, includes:
    determining, based on the group information, a predetermined position of the group dedicated signaling of the mobile station group to which the mobile station belongs in the first channel according to a predetermined position mode;
    determining a displacement amount changing with time;
    determining a multiplexing position of the group dedicated signaling of the mobile station group to which the mobile station belongs in the first channel based on the displacement amount and the determined predetermined position, as a position of the group dedicated signaling of the mobile station group to which the mobile station belongs in the first channel.

11. The method according to claim 9, wherein
in the predetermined position mode, the predetermined position of the group dedicated signaling of the mobile station group is indicated by a position in the first channel corresponding to a serial number of the mobile station group,
the group information includes the serial number of the mobile station group to which the mobile station belongs, and
the determining, based on the group information, a predetermined position of each group dedicated signaling in the first channel according to a predetermined position mode, includes:
  determining, based on the serial number of the mobile station group, the predetermined position of the group dedicated signaling of the mobile station group to which the mobile station belongs in the first channel according to the predetermined position mode.

12. The method according to claim 8, further comprising:
detecting a resource allocation signaling transmitted by the wireless base station, wherein the resource allocation signaling indicates the uplink resources allocated to the mobile station; and
determining the uplink resources allocated to the mobile station based on the resource allocation signaling, when the resource allocation signaling is detected.

13. The method according to claim 12, further comprising:
receiving scheduling method indicating information; and
determining whether to detect the group dedicated signaling and the mobile station dedicated signaling, or to detect the resource allocation signaling, based on the scheduling method indicating information.

14. A wireless base station for a Non-Orthogonal Multiple Access (NOMA) system, comprising:
a processor;
a storage medium, used to store computer program instructions, wherein when the processor performs the computer program instructions to perform following processing:
generating group dedicated signaling for each mobile station group managed by the wireless base station, wherein at least one mobile station group of mobile station groups includes a plurality of mobile stations and the group dedicated signaling indicates uplink resources allocated to the mobile station group, and wherein generating group dedicated signaling for each mobile station groups managed by the wireless base station includes:
  determining a channel state of each mobile station in the mobile station group, and determining a coding rate of the group dedicated signaling of the mobile station group based on a mobile station with a worst channel state, and
  generating the group dedicated signaling of the mobile station group based on the determined coding rate;
generating mobile station dedicated signaling for each mobile station in each of the mobile station groups, wherein the mobile station dedicated signaling at least includes group information indicating the mobile station group to which the mobile station belongs; and
multiplexing the generated group dedicated signaling to different positions of a first channel and transmit the signaling; and further configured to multiplex the generated mobile station dedicated signaling to a second channel and transmit the signaling.

15. The wireless base station according to claim 14, wherein when the processor performs the computer program instructions and further to perform following processing:
determining a predetermined position of each group dedicated signaling in the first channel according to a predetermined position mode; and
transmitting the group dedicated signaling in the predetermined position of each group dedicated signaling in the first channel.

16. The wireless base station according to claim 14, wherein when the processor performs the computer program instructions and further to perform following processing:
determining a predetermined position of each group dedicated signaling in the first channel according to a predetermined position mode;
determining a displacement amount changing with time;
determining a multiplexing position of each group dedicated signaling in the first channel based on the displacement amount and the predetermined position of each group dedicated signaling; and
transmitting the group dedicated signaling in the multiplexing position of each group dedicated signaling in the first channel.

17. The wireless base station according to claim 15, wherein when the processor performs the computer program instructions and further to perform following processing:
numbering the respective mobile station groups, respectively, wherein
in the predetermined position mode, the predetermined position of the group dedicated signaling of the mobile station group is indicated by a position in the first channel corresponding to a serial number of the mobile station group, and
the group information includes the serial number of the mobile station group to which the mobile station belongs.

18. The wireless base station according to claim 14, wherein when the processor performs the computer program instructions and further to perform following processing:
determining, based on a transmission power of a mobile station, whether there are uplink resources non-serviceable for the mobile station in the uplink resources allocated to the mobile station group to which the mobile station belongs;
dividing the mobile station group to which the mobile station belongs into a first mobile station group including the mobile station and a second mobile station group not including the mobile station, when there are the uplink resources non-serviceable for the mobile station; and
generating group dedicated signaling for the first mobile station group and the second mobile station group respectively, wherein group dedicated signaling of the second mobile station group indicates the uplink resources identical with those allocated to the mobile station group before the dividing, and group dedicated signaling of the first mobile station group indicates the uplink resources identical with those allocated to the mobile station group before the dividing, except the uplink resources non-serviceable for the mobile station.

* * * * *